(12) United States Patent
Naito et al.

(10) Patent No.: US 6,741,003 B2
(45) Date of Patent: May 25, 2004

(54) PERMANENT MAGNET ROTOR

(75) Inventors: Shinya Naito, Shizuoka (JP);
Haruyoshi Hino, Shizuoka (JP)

(73) Assignee: Yamaha Hatsudoki Kabushiki Kaisa, Shizuoka-ken (JP)

( * ) Notice: Subject to any disclaimer, the term of this patent is extended or adjusted under 35 U.S.C. 154(b) by 0 days.

(21) Appl. No.: 10/347,721

(22) Filed: Jan. 17, 2003

(65) Prior Publication Data

US 2003/0102755 A1 Jun. 5, 2003

Related U.S. Application Data

(62) Division of application No. 09/945,139, filed on Aug. 30, 2001, now Pat. No. 6,555,940.

(30) Foreign Application Priority Data

Aug. 31, 2000 (JP) ........................................ 2000-263984

(51) Int. Cl.$^7$ ................................................. H02K 1/27
(52) U.S. Cl. ............................ 310/156.53; 310/156.48; 310/156.56; 310/261
(58) Field of Search ........................ 310/156.48, 156.49, 310/156.53, 156.55, 156.56, 261, 156.01–156.02, 156.51, 156.52

(56) References Cited

U.S. PATENT DOCUMENTS

| 4,924,130 | A | 5/1990 | Fratta ......................... 310/261 |
| 5,801,478 | A | 9/1998 | Nashiki |
| 5,898,253 | A | 4/1999 | El-Antably et al. ......... 310/261 |
| 5,945,760 | A | 8/1999 | Honda et al. .......... 310/156.53 |
| 6,084,496 | A | 7/2000 | Asano et al. ................ 335/284 |
| 6,087,751 | A | * 7/2000 | Sakai ..................... 310/156.45 |
| 6,121,706 | A | 9/2000 | Nashiki et al. ............. 310/168 |
| 2002/0041127 | A1 | 4/2002 | Naito et al. ............ 310/156.07 |
| 2002/0047409 | A1 | 4/2002 | Hiroyuki et al. ............ 310/100 |
| 2002/0070620 | A1 | 6/2002 | Naito et al. ............ 310/156.56 |
| 2003/0025415 | A1 | 2/2003 | Hino et al. ............. 310/156.56 |
| 2003/0030343 | A1 | 2/2003 | Naito et al. ............ 310/156.56 |

FOREIGN PATENT DOCUMENTS

| EP | 0 746 079 A2 | 12/1996 | ............ H02K/1/27 |
| EP | 0 905 858 A1 | 3/1999 | ............ H02K/1/27 |
| EP | 1 164 683 A2 | 12/2001 | |
| EP | 1 176 700 A2 | 1/2002 | |
| EP | 1 184 956 A1 | 3/2002 | |
| JP | 08 336247 A | 12/1996 | ............ H02K/1/27 |

(List continued on next page.)

OTHER PUBLICATIONS

Copy of Sep. 25, 2003 European Search Report in corresponding European Application No. 03017958.4–2207.

(List continued on next page.)

Primary Examiner—Burton Mullins
(74) Attorney, Agent, or Firm—Knobbe, Martens, Olson & Bear, LLP

(57) ABSTRACT

To decrease torque ripples and cogging torque, a rotor for an electrical motor, an electrical generator, or the like, includes lengths of permanent magnets embedded in a plurality of slit sections in respective layers. In an embodiment having three layers, the permanent magnets have lengths $L_1$, $L_2$ and $L_3$ in order as viewed from the outside circumference side of the rotor core and generate respective total magnetic fluxes of $\Phi_1$, $\Phi_2$, $\Phi_3$, respectively, when the rotor is assembled in a rotary electric device. The lengths have a relation $L_1<L_2<L_3$, and the magnetic fluxes have a relation $\Phi_1<\Phi_2<\Phi_3$.

4 Claims, 9 Drawing Sheets

FOREIGN PATENT DOCUMENTS

| | | | | |
|---|---|---|---|---|
| JP | 08336269 | A2 | 12/1996 | |
| JP | 09 023598 | A | 1/1997 | ............ H02K/1/27 |
| JP | 09266646 | A2 | 10/1997 | |
| JP | 10271722 | A2 | 10/1998 | |
| JP | 11 103547 | A | 4/1999 | ............ H02K/1/27 |
| JP | 11206075 | A2 | 7/1999 | |
| JP | 11262205 | A2 | 9/1999 | |
| JP | 2002-010547 | | 1/2002 | |
| JP | 2002-078259 | | 3/2002 | |
| WO | WO 03/012956 | A1 | 2/2003 | |

OTHER PUBLICATIONS

A copy of the International Search Report dated Dec. 21, 2001, conducted by the European Patent Office in a corresponding European Patent application EP 01 12 1013.

Hiroshi Murakami, et al., Highly Efficient Double Layer IPM (Interior Permanent Magnet) Motor, Matsushita Technical Journal, vol. 44, No. 2, Apr. 1998, pp. 37–42. (Reference in Japanese with English abstract and drawing captions).

Fumitoshi Yamashita, et al., Magnetic Stability of Exchange Spring Magnets and Application to Direct Molding Magnet Rotor, Matsushita Technical Journal, vol. 44, No. 2, Apr. 1998, pp. 78–86. (Reference in Japanese with English abstract and drawing captions).

Co–pending patent application: Ser. No. 09/882,370, filed Jun. 15, 2001, entitled Permanent Magnet Rotor and Method of Making the Same, in the name of Shinya Naito et al and assigned to Yamaha Hatsudoki Kabushiki Kaisha.

\* cited by examiner $L_2 = L_{21} + L_{22}$
$L_3 = L_{31} + L_{32}.$

PERMANENT MAGNET ROTOR

RELATED APPLICATIONS

This application is a divisional application of U.S. patent application Ser. No. 09/945,139 filed on Aug. 30, 2001 now U.S. Pat. No. 6,555,940, which claims the benefit of priority under 35 U.S.C. § 119 from Japanese Patent Application No. 2000-263984, filed on Aug. 31, 2000.

BACKGROUND OF THE INVENTION

1. Field of the Invention

This invention relates to a permanent magnet rotor in a permanent magnet type rotary electric device such as, for example, a permanent magnet electric motor or a permanent magnet generator, and particularly relates to an embedded magnet type permanent magnet rotor, suited for use in an inner rotor type permanent magnet rotary electric device for effecting decreased torque ripples and cogging torque.

2. Description of the Related Art

A conventional embedded magnet type permanent magnet rotor has been disclosed, for example, in Laid Open Japanese Patent Application Hei-11-262205 or Hei-11-206075, and is illustrated in FIG. 12 herein. The permanent magnet rotor is illustrated in FIG. 12 with respect to the shape of one pole of the rotor in end view. The rotor has a rotor core 1 formed with a plurality of slits 2A, 2B, 2C in multiple layers. Each of the slits 2A, 2B, 2C has an end face in the shape of an arc. The arc is configured such that the longitudinal ends of the arc are located in the vicinity of the outside circumferential surface of the rotor core 1 and such that the longitudinal middle portion of the arc is located radially inwardly of the end portions. Each slit 2A, 2B, 2C extends to the opposite end of the rotor core 1 in the axial direction (i.e., perpendicular to the plane of FIG. 12), and each slit has the same cross sectional shape through its length as the shape of the end face shown in FIG. 12.

In order to form a permanent magnet rotor 10 having a rotor core 1 with permanent magnets embedded, bond magnet (plastic magnet) may be filled in the slits 2A, 2B, 2C and solidified. That is, the bond magnets in the slits 2A, 2B, 2C are formed by injection molding. Preferably, the bond magnet is filled in a magnetic field. Alternatively, permanent magnets are machined respectively in the shapes of the slits 2A, 2B, 2C, and are fitted in the slits 2A, 2B, 2C. As shown in the permanent magnet rotor 10 of FIG. 12, bridges 3 of a certain thickness are formed between the longitudinal ends (portions close to the outside circumferential surface of the rotor core 1) of the slits 2A, 2B, 2C and the outside circumferential surface of the core 1. Thus, the radially outer portions of the rotor core 1 proximate to each slit 2A, 2B, 2C (i.e., the portions of the rotor core proximate to the outside circumferential surface of each slit) and the radially inner portions of the rotor core 1 (i.e., the portions of the rotor core on the center axis side of each slit) will not be perfectly separated by the slits 2A, 2B, 2C. Rather, the bridges provide magnetic paths between the portions of the rotor core on either side of each of the slits 2A, 2B, 2C.

In the conventional permanent magnet rotor 10 described above, the distribution of magnetic flux density formed in the clearance between the rotor and the stator when the rotor is assembled in a rotary electric device is shown in FIG. 13. As illustrated, the distribution of the flux density is in the shape of approximately a rectangular wave, so that the distortion factor is large. The large distortion factor results in increased torque ripples and cogging torque.

SUMMARY OF THE INVENTION

The embodiments of the present invention are directed to a permanent magnet rotor that has decreased torque ripples and cogging torque.

One aspect of the present invention is an embodiment of a permanent magnet rotor having a rotor core that comprises a plurality of magnetic poles. The rotor core includes a plurality of permanent magnets embedded in slit sections formed in layers for each magnetic pole. The layers comprise a radially innermost layer, a least one intermediate layer, and a radially outermost layer. The radially innermost layer and the at least one intermediate layer each include at least one vacant slit section in which no permanent magnet is embedded. The vacant section in the radially innermost layer is larger than the vacant slit section in the intermediate layer. The permanent magnets embedded in the slit sections in each layer generate magnetic flux. The permanent magnets embedded in the slit sections of the radially innermost layer generate more magnetic flux than the permanent magnets embedded in the slit sections of the at least one intermediate layer.

In accordance with certain preferred embodiments of this aspect of the present invention in which the vacant slits are provided in the foregoing configuration, the amount of total magnetic flux generated by each permanent magnet layer when the rotor is assembled in a rotary electric device is larger for a radially inward layer than for a radially outward layer. Therefore, the distribution of magnetic flux density formed in the clearance between the rotor and the stator has a stepped shape that is closer to a sinusoidal wave rather than to a rectangular wave. Thus, compared with a conventional permanent magnet rotor, the distortion factor of the waveform of induced voltage is decreased. Torque ripples, cogging torque, noises and vibrations are also decreased.

Another aspect of the present invention is an embodiment of a permanent magnet rotor having a rotor core that comprises a plurality of magnetic poles. The rotor core includes a plurality of permanent magnets embedded in slit sections formed in layers for each magnetic pole. The layers comprise a radially innermost layer, at least one intermediate layer, and a radially outermost layer. The permanent magnets in the radially innermost layer, the at least one intermediate layer and the radially outermost layer are selected to have residual flux densities. The residual flux density of the permanent magnet in the at least one intermediate layer is greater than the residual flux density in the radially innermost layer. The residual flux density of the permanent magnet in the radially outermost layer is greater than the residual flux density of the permanent magnet in the at least one layer. The total magnetic flux generated by the permanent magnet in the radially innermost layer is greater than the total magnetic flux generated by the permanent magnet in the at least one intermediate layer. The total magnetic flux generated by the permanent magnet in the at least one intermediate layer is greater than the total magnetic flux generated by the permanent magnet in the radially outermost layer.

In particularly preferred embodiments in accordance with this aspect of the present invention, at least one of the layers of slit sections has at least one vacant slit in which no permanent magnet is embedded.

In certain preferred embodiments in accordance with this aspect of the present invention, the shape of the distribution of magnetic flux density formed in the clearance between the rotor and the stator can be made closer to a sinusoidal wave than to a rectangular wave, without having any vacant slits, so that magnets can be embedded more efficiently in the rotor core to facilitate size reduction.

Another aspect of the present invention is an embodiment of a permanent magnet rotor having a rotor core that comprises a plurality of magnetic poles. The rotor core includes a plurality of permanent magnets embedded in slit sections formed in layers for each magnetic pole. The layers comprise a radially innermost layer, at least one intermediate layer, and a radially outermost layer. Each layer has a respective mean residual magnetic flux density determined by the kind of permanent magnet in each layer and by a length of the permanent magnet in each layer. At least one of the layers comprises a plurality of slit sections. The plurality of slit sections in the at least one of the layers comprise at least a first kind of permanent magnet having a first residual magnetic flux density and at least a second kind of permanent magnet having a second residual magnetic flux density different from the first residual magnetic flux density. The at least one of the layers has a mean residual magnetic flux density determined by the first and second residual magnetic flux densities and by a length of the first kind of permanent magnet and a length of the second kind of permanent magnet in the at least one of the layers. The mean residual magnetic flux densities of the layers and the lengths of the permanent magnets in the layers are selected so that the mean residual magnetic flux density of the radially innermost layer is smaller than the mean residual magnetic flux density of the at least one intermediate layer, so that the mean residual magnetic flux density of the at least one intermediate layer is less than the mean residual magnetic flux density of the radially outermost layer, and so that a total magnetic flux generated by the permanent magnet in the radially innermost layer is greater than a total magnetic flux generated by the permanent magnet in the radially outermost layer.

In particularly preferred embodiments in accordance with this aspect of the present invention, at least one of the layers of slit sections has at least one vacant slit in which no permanent magnet is embedded. The magnetic characteristics of a permanent magnet layer with a vacant slit is equivalent to that of a permanent magnet layer without a vacant slit in which a different kind of magnet is embedded. Thus, this particular embodiment can facilitate a reduction in the kinds of magnets.

In certain embodiments according to this aspect of the present invention, a plurality of kinds of magnets are embedded in a slit section, so that even if the number of the kinds of available magnets is smaller than that of the slit sections, the permanent magnet rotor is able to produce the same effect as the rotor in accordance with the previously described embodiment of the invention to also facilitate cost reduction.

Another aspect of the present invention is an embodiment of a permanent magnet rotor having a rotor core that comprises a plurality of magnetic poles. The rotor core includes a plurality of permanent magnets embedded in slit sections formed in layers for each magnetic pole. The layers comprise at least a radially innermost layer and a radially outermost layer. Each layer has a respective middle portion and respective longitudinal ends. The layers are spaced apart from each other by respective distances. The distances by which the layers are spaced apart are greater between the respective longitudinal ends of the layers than between the respective middle portions of the layers.

In certain embodiments in accordance with this aspect of the present invention, distances between permanent magnets are differentiated, so that the shape of the distribution of magnetic flux density formed in the clearance between the rotor and the stator when the rotor is assembled in a rotary electric device can be made closer to a sinusoidal wave rather than to a rectangular wave. Therefore, a change in the distribution of magnetic flux density is more moderate compared with a conventional permanent magnet rotor, thereby reducing torque ripples and cogging torque, as well as noises and vibrations.

In preferred versions of the embodiments described above, a first straight line is defined radially outward from a center of the rotor core through a center of the magnetic pole. A second straight line is defined radially outward from the center of the core to a longitudinal end of the permanent magnet in the radially outermost layer. A third straight line is defined radially outward from the center of the core to a longitudinal end of the permanent magnet in the at least one intermediate layer proximate to the longitudinal end of the permanent magnet in the radially outermost layer. A fourth straight line is defined radially outward from the center of the core to a longitudinal end of the permanent magnet in the radially innermost layer proximate to the longitudinal end of the permanent magnet in the at least one intermediate layer. A fifth straight line is defined radially outward from the center of the core midway between the magnetic pole and an adjacent magnetic pole. A first angle defined between the first straight line and the second straight line is greater than a second angle defined between the second straight line and the third straight line. The second angle is greater than a third angle defined between the third straight line and the fourth straight line. The third angle is greater than a fourth angle defined between the fourth straight line and a fifth straight line. In accordance with this version of the embodiments, the shape of the distribution of magnetic flux density formed in the clearance between the rotor and the stator when the rotor is assembled in a rotary electric device can be made closer to a sinusoidal wave, which results in a greater reduction in the distortion factor of induced voltage, torque ripples and cogging torque, as well as a reduction in noises and vibrations.

In further preferred versions of the embodiments described above, each layer of permanent magnets has first and second longitudinal ends proximate to respective locations on an outer circumference of the rotor core. The ends are spaced from the respective locations on the outer circumference by respective bridges. A first pair of straight lines is defined between a center of the rotor core and the longitudinal ends of the radially outermost layer, and a first electrical angle $\theta_1$ is defined between the first pair of straight lines. A second pair of straight lines is defined between a center of the rotor core and the longitudinal ends of the at least one intermediate layer, and a second electrical angle $\Phi_2$ is defined between the second pair of straight lines. An $n^{th}$ pair of straight lines is defined between a center of the rotor core and the longitudinal ends of the radially innermost layer, and an $n^{th}$ electrical angle $\theta_n$ is defined between the n $^{th}$ pair of straight lines. The radially outermost layer generates a total magnetic flux $\Phi_1$. The at least one intermediate layer generates a total magnetic flux $\Phi_2$. The radially innermost layer generates a total magnetic flux $\Phi_n$. The following expression of equality between ratios is at least approximately satisfied:

$$(\Phi_1-(d_1\ Bs)){:}(\Phi_2-(d_2\ Bs)){:}\ldots{:}(\Phi_n-(dn\ Bs))=$$
$$\theta_1\cos(\theta_1/4){:}(\theta_2-\theta_1)\cos((\theta_2+\theta_1)/4)+\theta_1\cos(\theta_1/4){:}\ldots$$
$${:}(\theta_n-\theta_{n-1})\cos((\theta_n+\theta_{n-1})/4)+(\theta_{n-1}-\theta_{n-2})\cos((\theta_{n-1}+\theta_{n-2})/4)+\ldots$$
$$+(\theta_2-\theta_1)\cos((\theta_2+\theta_1)/4+\theta_1\cos(\theta_1/4) \tag{1}$$

where $d_1$ represents the sum of widths of bridges of the radially outermost layer, $d_2$ represents the sum of widths of bridges of the at least one intermediate layer, $d_n$ represents the sum of widths of bridges of the radially innermost layer, and Bs is a saturated magnetic flux density of the rotor core. Advantageously, when the expression including the electrical angles $\theta_1, \theta_2, \ldots \theta_n$ and the amounts of total magnetic flux $\Phi_1, \Phi_2, \ldots \Phi_n$ is satisfied or approximately satisfied, the shape of the distribution of magnetic flux density formed in the clearance between the rotor and the stator when the rotor is assembled in a rotary electric device is close to a stepped sinusoidal wave which is almost ideal. This results in a substantial reduction in the distortion factor of induced voltage, torque ripples and cogging torque, as well as a reduction in noises and vibrations.

In particularly preferred embodiments, the embedded permanent magnets are formed such that the slits are filled with bond magnet and the bond magnet is then solidified. Advantageously, the permanent magnets are formed by injection molding the bond magnet so that the permanent magnets can be embedded in the rotor core even if the shape of the slits is rather complicated. The injection molding using bond magnet may be an ordinary one in which the bond magnet is filled in the slits and then solidified, or, if the bond magnet is anisotropic, the process may be an in-magnetic field injection molding in which the bond magnet is filled in the slits and solidified in a magnetic field.

BRIEF DESCRIPTIONS OF THE DRAWINGS

The preferred embodiments of the present invention will be described below in connection with the accompanying drawing figures, in which.

Figure 6:
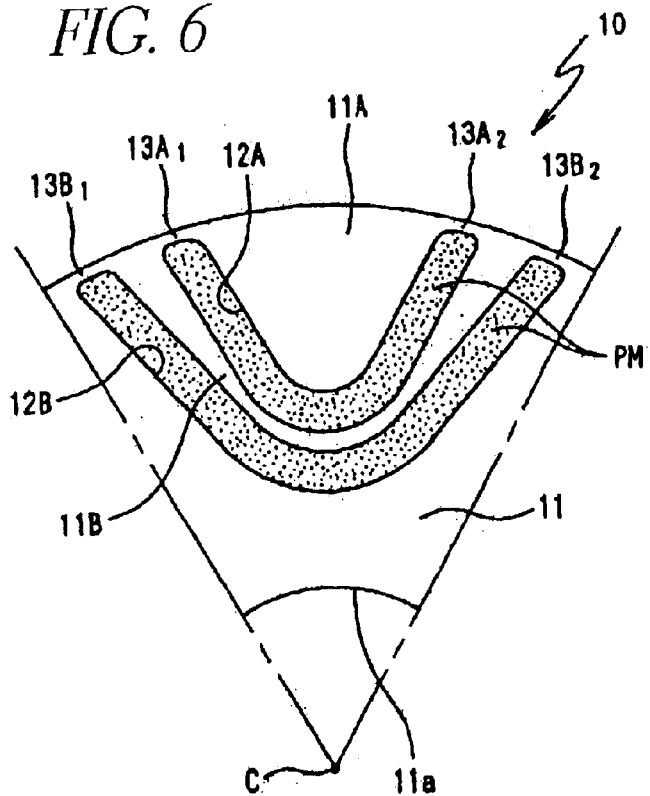
FIG. 6 is a view showing the configuration of a fifth embodiment of this invention.
Figure 7:
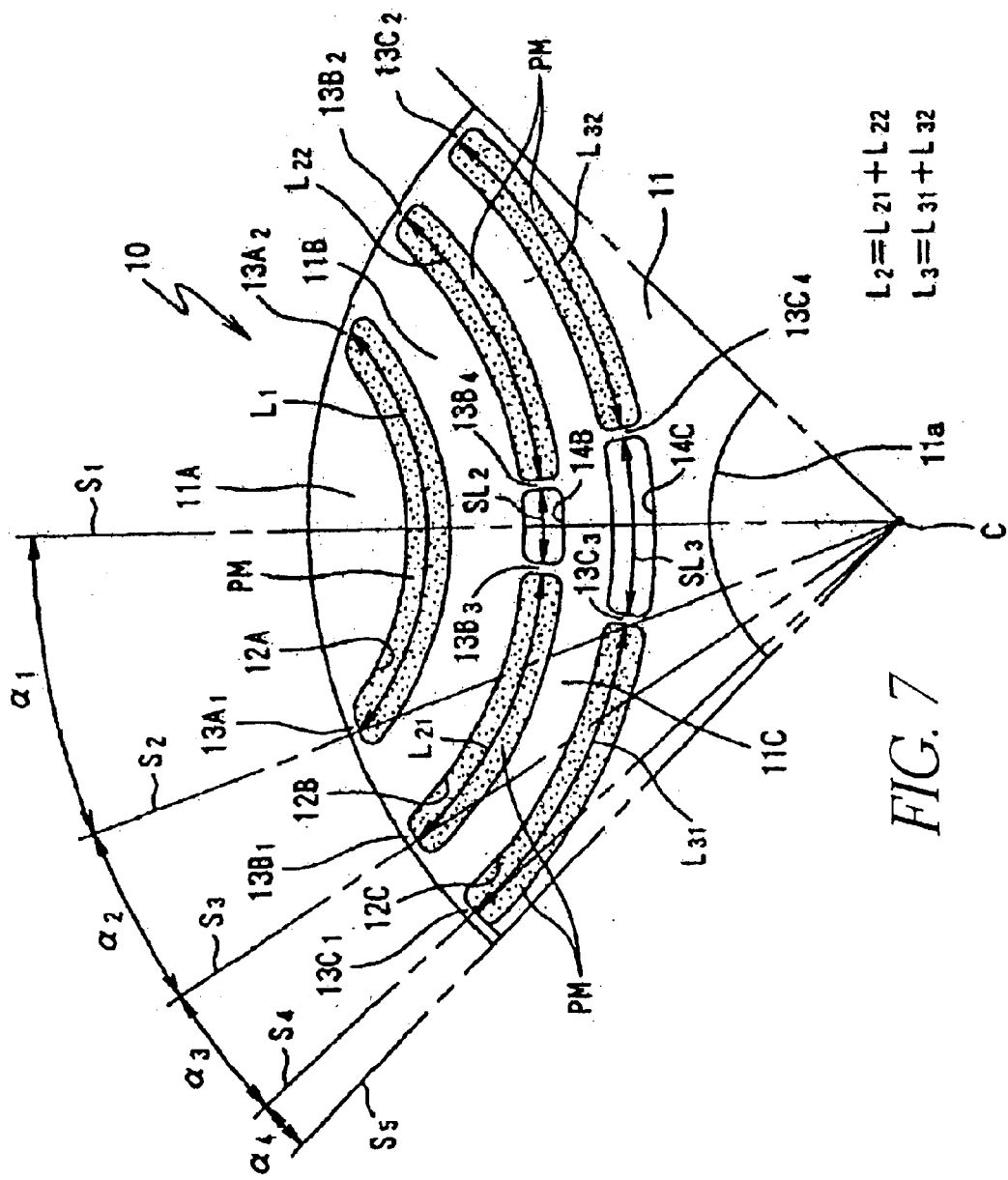
FIG. 7 is a view showing the configuration of a sixth embodiment of this invention.
Figure 8:
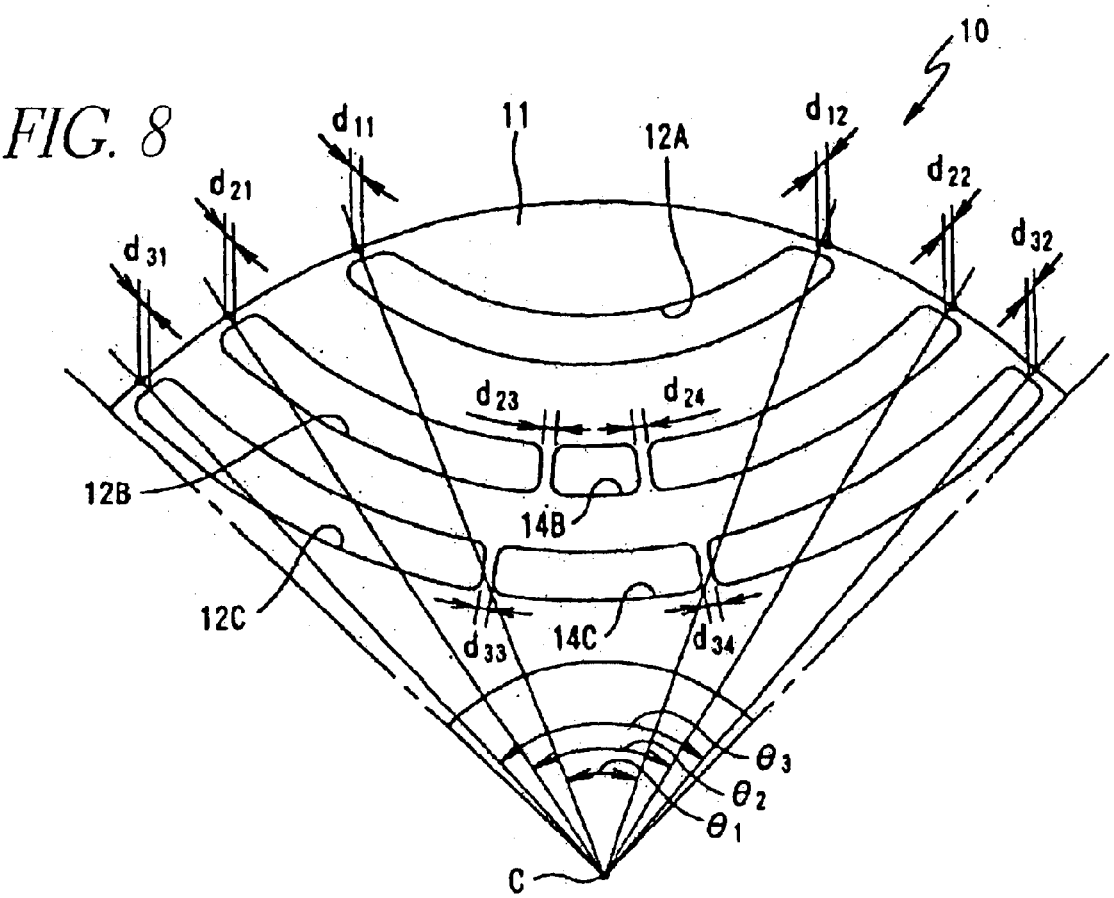
FIG. 8 is a view showing the configuration of a seventh embodiment of this invention.
Figure 14:
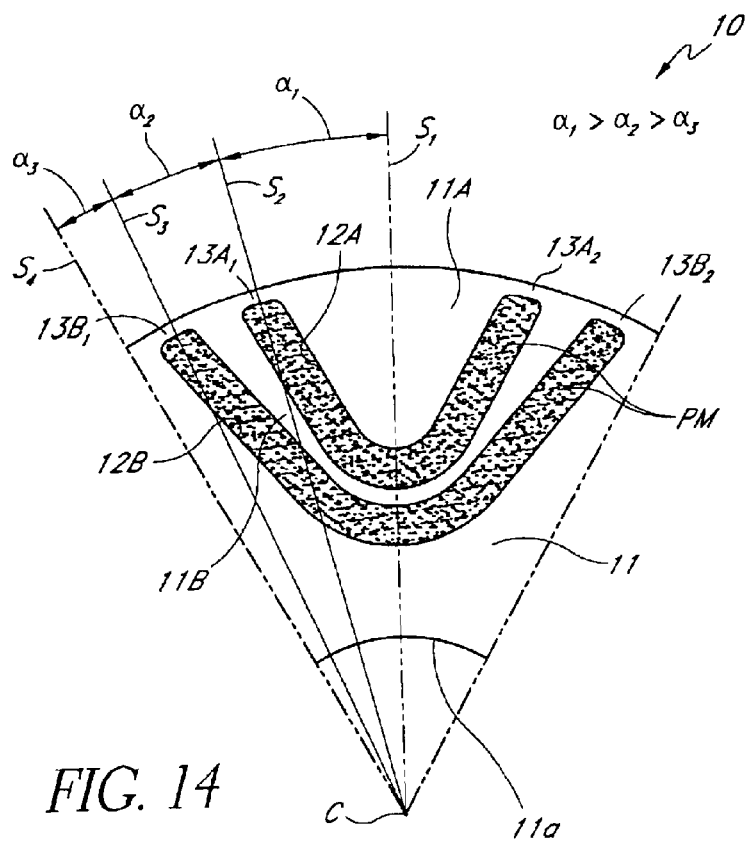
Figure 15:
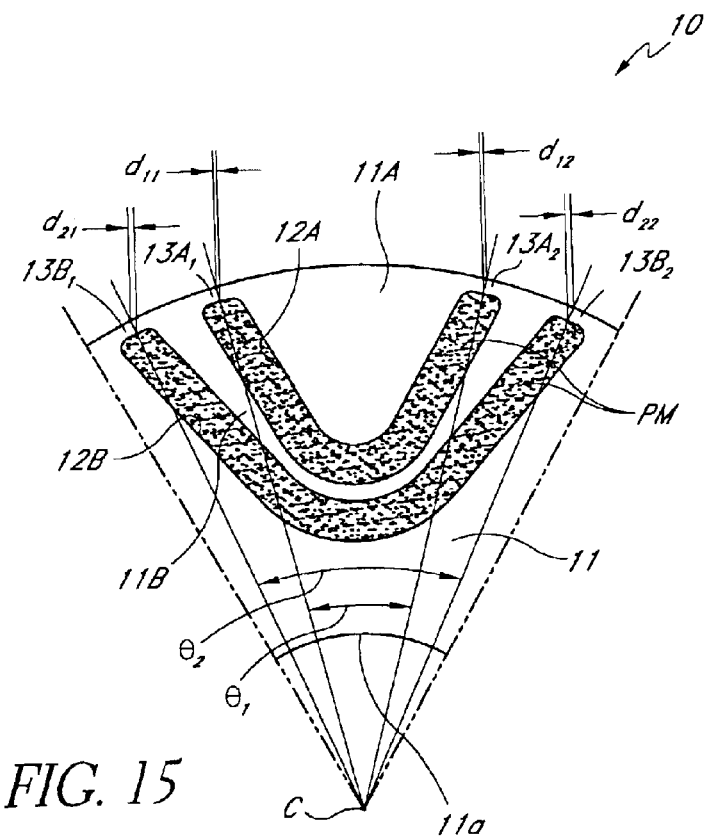

FIG. 14 is a view showing a configuration of an embodiment of the rotor core having two slits generally in accordance with the fifth embodiment of FIG. 6, which illustrates lines and angles identified in accordance with the identification of the lines and angles of FIG. 7; and FIG. 15 is a view showing a configuration of an embodiment of the rotor core having two slits generally in accordance with the fifth embodiment of FIG. 6, which illustrates angles and bridge widths identified in accordance with the identification of the angles and bridge widths of FIG. 8.

DETAILED DESCRIPTION OF THE PREFERRED EMBODIMENTS

Preferred embodiments of the present invention will be described below with reference to the drawings.

Figure 1:
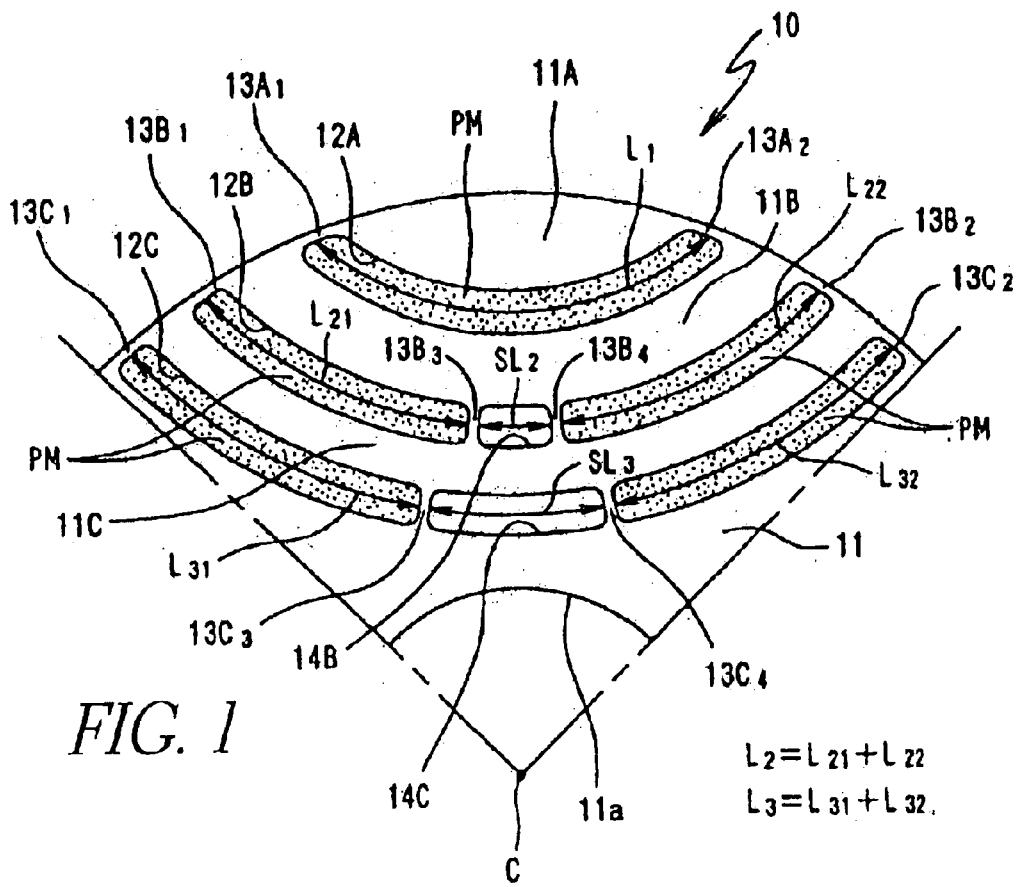
FIG. 1 is a view showing the configuration of a first embodiment of this invention.
Figure 2:
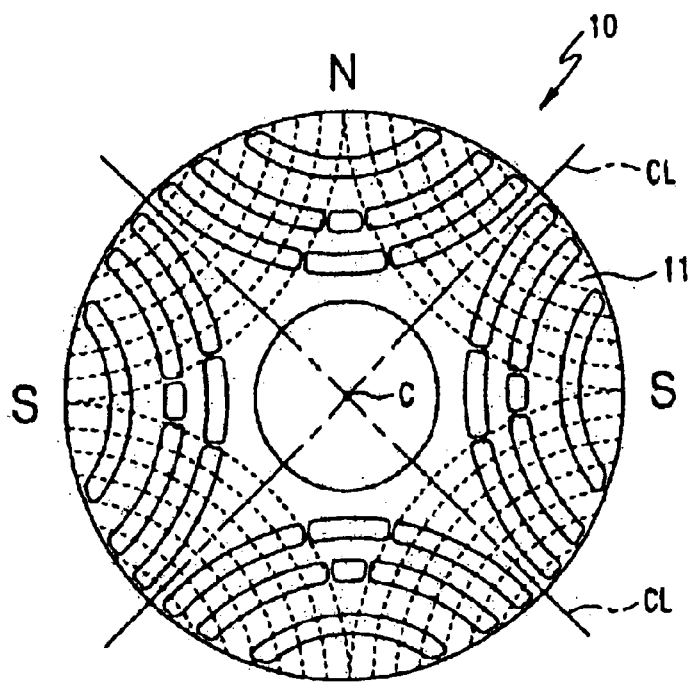
FIG. 2 is a view illustrating the directions of magnetization.

FIGS. 1 and 2 illustrate end views of a four-pole permanent magnet rotor core 10 in accordance with a first embodiment of this invention. The rotor core 10 is used for an inner rotor type permanent magnet motor or the like. As shown in FIG. 2, the permanent magnet rotor 10 has a rotor core 11 in the shape of a column (extending perpendicular to the plane of FIG. 2) made of numerous thin round blanked-out plates that are laminated to form the column. The rotor core 11 includes a shaft hole 11a (FIG. 1) in which unillustrated rotary shaft is adapted to be inserted coaxially.

FIG. 1 illustrates the shape of one pole of the rotor core 11 of the permanent magnet rotor 10. The rotor core 11 is formed with slit sections 12A, 12B, 12C of an arc that is convex in the direction toward the shaft hole 11a and that is concave towards the outer circumference of the rotor core 11. The ends of each arc are proximate to the outer circumference of the rotor core 11, but, as discussed below, do not extend to the outer circumference.

The slit sections 12A, 12B, 12C penetrate the rotor core 11 between both end faces thereof (i.e., the slit sections 12A, 12B, 12C extend through the length of the column of rotor core). The slit sections 12A, 12B, 12C are arranged in layers concentrically such that the slit section 12A on the radially outer side of the rotor core 11 is in the shape of an arc with a small diameter, the slit section 12C on the radially inner side is in the shape of and arc with a large diameter, and the intermediate slit section 12B is in the shape of an arc with a medium diameter.

To keep the radially outer portion 11A of the rotor core 11 with respect to the slit section 12A from being separated from the radially inner portion thereof, a pair of bridges $13A_1$, $13A_2$ are formed at the longitudinal ends of the slit section 12A.

Similarly, to keep the radially outer portions 11B of the rotor core 11 with respect to the intermediate slit section 12B from being separated from the radially inner portion thereof, a pair of bridges $13B_1$, $13B_2$ are formed at the longitudinal ends of the slit section 12B. In addition, a second pair of bridges $13B_3$, $13B_4$ are formed at two locations in the middle of the slit section 12B. Because of the second pair of bridges $13B_3$, $13B_4$, the intermediate slit section 12B has a first portion defined between the bridge $13B_1$ and the bridge $13B_3$ and has a second portion defined between the bridge $13B_2$ and the bridge $13B_4$. A third portion 14B, defined between the bridges $13B_3$ and $13B_4$, is discussed below.

Further, to keep the radially outer portions 11C of the rotor core 11 with respect to the slit section 12C from being separated from the radially inner portion of the rotor core 11, a pair of bridges $13C_1$, $13C_2$ are formed at the longitudinal ends of the slit section 12C. In addition, a pair of bridges $13C_3$, $13C_4$ are formed at two locations in the middle of the slit section 12C. Because of the second pair of bridges $13C_3$, $13C_4$, the slit section 12C has a first portion defined between the bridge $13C_1$ and the bridge $13C_3$ and has a second portion defined between the bridge $13C_2$ and the bridge $13C_4$. A third portion 14C, defined between the bridges $13C_3$ and $13C_4$, is discussed below.

Embedded permanent magnets PM are positioned in the slit sections 12A–12C. In particular, the whole slit 12A has a permanent magnet embedded therein. The portion of the slit 12B between the bridges $13B_1$ and $13B_3$ and the portion of the slit 12B between the bridges $13B_2$ and $13B_4$ have a respective permanent magnet embedded therein. Similarly, the portion of the slit 12C between the bridges $13C_1$ and $13C_3$ and the portion of the slit 12C between bridges $13C_2$ and $13C_4$ have a respective permanent magnet embedded therein. The permanent magnets in the slit 12A and the portions of the slits 12B and 12C preferably have the same characteristic. Each magnet is magnetized in the direction of the width of the respective slit 12A, 12B, 12C, as illustrated by the dashed lines in FIG. 2. The permanent magnets PM may be formed by filling the slit section 12A and the portions of the slit sections 12B, 12C with bond magnet material. The bond magnet material is solidified and then magnetized. For a small and powerful permanent magnet PM, anisotropic bond magnet may be used to form permanent magnets PM orientated in the direction of thickness, by in-magnetic field injection molding.

As further illustrated in FIG. 1, no permanent magnets are embedded in the portion 14B defined between the bridges $13B_3$ and $13B_4$ of the slit section 12B or in the portion 14C defined between the bridges $13C_3$ and $13C_4$ of the slit section 12C.

The vacant slits 14B, 14C are formed in the slit sections 12B, 12C, respectively, approximately at the longitudinal middle portions thereof. The vacant slits 14B, 14C have a symmetrical shape with respect to the center line of the magnetic pole. As illustrated, in the embodiment of FIGS. 1 and 2, the vacant slit 14C formed in the slit section 12C on the inside circumference side has a length $SL_3$ that is larger than a length $SL_2$ of the vacant slit 14B formed in the intermediate slit section 12B.

In FIG. 1, the length of the embedded magnet in the slit 12A from the longitudinal end of the slit 12A proximate to the bridge $13A_1$ to the longitudinal end of the slit 12A proximate to the bridge $13A_2$ is $L_1$.

The length of the embedded magnet in the first portion of the slit 12B from the longitudinal end of the slit 12B proximate to the bridge $13B_1$ to the longitudinal end of the slit 12B proximate to the bridge $13B_3$ is $L_{21}$. The length of the embedded magnet in the second portion of the slit 12B from the longitudinal end of the slit 12B proximate to the bridge $13B_2$ to the longitudinal end of the slit 12B proximate to the bridge $13B_4$ is $L_{21}$. Thus, the total length of the embedded magnet in the slit 12B, not including the widths of the bridges $13B_1$, $13B_2$, $13B_3$, $13B_4$ and the length $SL_2$ of the vacant slit 14B, is $L_2=L_{21}+L_{22}$.

The length of the embedded magnet in the first portion of the slit 12C from the longitudinal end of the slit 12C proximate to the bridge $13C_1$ to the longitudinal end of the slit 12C proximate to the bridge $13C_3$ is $L_{31}$. The length of the embedded magnet in the second portion of the slit 12C from the longitudinal end of the slit 12C proximate to the bridge $13C_2$ to the longitudinal end of the slit 12C proximate to the bridge $13C_4$ is $L_{31}$. Thus, the total length of the embedded magnet in the slit 12C, not including the widths of the bridges $13C_1$, $13C_2$, $13C_3$, $13C_4$ and the length $SL_3$ of the vacant slit 14C, is $L_3=L_{31}+L_{32}$.

Using the foregoing definitions for $L_1$, $L_2$, and $L_3$, the following expressions (2), (3) are satisfied for the embodiment of FIGS. 1 and 2:

$$SL_2<SL_3 \quad (2),$$

$$L_1<L_2<L_3 \quad (3).$$

Therefore, since the relation as shown in the expression (3) is true, the relation between the amounts of total magnetic flux $\Phi_1$ in the slit section 12A, the total magnetic flux $\Phi_2$ in the slit section 12B, and the total magnetic flux $\Phi_3$ in the slit section 12C can be expressed as:

$$\Phi_1<\Phi_2<\Phi_3 \quad (4).$$

FIG. 2 is a view of the shape of the whole end face of the permanent magnet rotor 10 in this embodiment. FIG. 2 shows the directions of orientation and magnetization of the permanent magnets. The permanent magnet rotor 10 has four magnetic poles (two north (N) poles, and two south (S) poles), each having the shape of the pole shown in FIG. 1. The directions of orientation and magnetization of the magnets PM are tangential ones of concentric circles with a center on straight lines CL passing through the rotation center C of the rotor core 11 along the boundaries between magnetic poles.

In the embodiment of the permanent magnet rotor 10 shown in FIGS. 1 and 2, the expressions (2), (3) and (4) are satisfied. Thus, the distribution of magnetic flux density formed in the clearance between the rotor and the stator when the rotor is assembled in a rotary electric device has a stepped shape close to a sinusoidal wave. Therefore, in this embodiment of the permanent magnet 10, the distortion factor of the waveform of induced voltage is decreased compared with a conventional permanent magnet rotor. In addition, torque ripples, cogging torque, noises and vibrations are reduced.

Furthermore, in the embodiment of the permanent magnet rotor 10 in FIGS. 1 and 2, which utilize the vacant slits 14B, 14C, the distribution of magnetic flux density formed in the clearance described above has a stepped shape close to a sinusoidal wave. Thus, it is unnecessary to partially narrow the distances between the slit sections 12A, 12B, 12C. As shown in FIG. 1, the distances between the layers (i.e., between the slits) are approximately constant over the entire length of the slits, thereby avoiding a drop in reluctance torque.

The positions of the vacant slits 14B, 14C are not specifically limited. In the embodiment illustrated in FIGS. 1 and 2, the vacant slits 14B, 14C are located in the slit sections 12B, 12C, respectively, at the longitudinal middle portions of the respective slits. As illustrated in FIG. 2, the longitudinal middle portions of the slit sections 12B, 12C are located at positions where the magnetic flux does not reach easily, and where control of the flux density is difficult to maintain during orientation and magnetization. By positioning the vacant slits 14B, 14C in regions where no magnetic flux is ordinarily generated and where appropriate orientation and magnetization are difficult to achieve, the permanent magnet in accordance with the present embodiment can be utilized efficiently.

Figure 3:
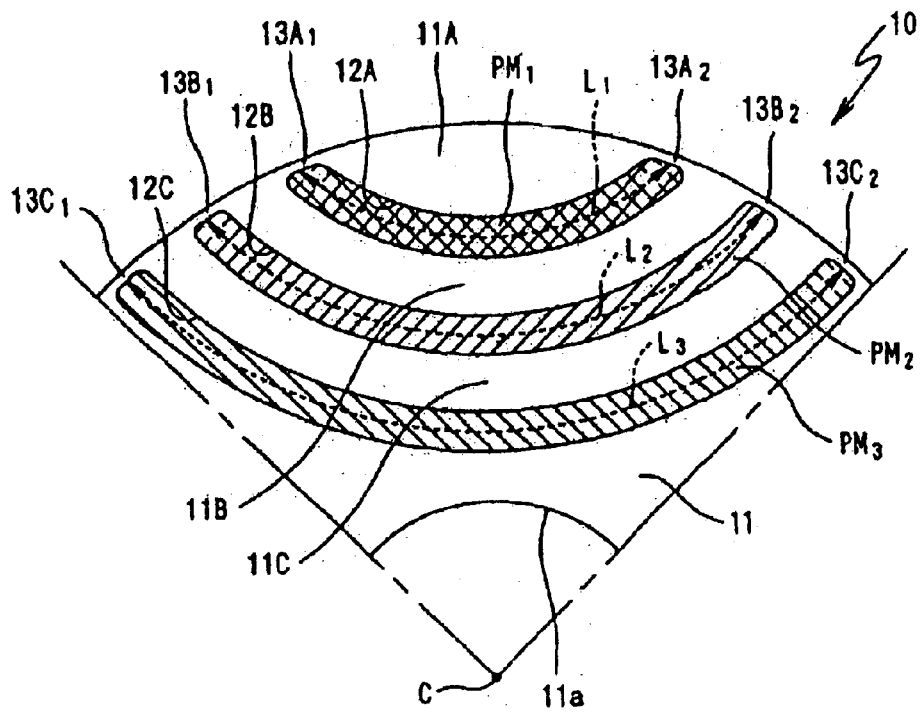
FIG. 3 is a view showing the configuration of a second embodiment of this invention.

FIG. 3 illustrates an end view of one pole of the permanent magnet rotor 10 in accordance with a second embodiment of the present invention. In FIG. 3, like elements as in the first embodiment of FIGS. 1 and 2 are designated by like symbols, and repeated descriptions of such elements are omitted.

In the embodiment of FIG. 3, as in the embodiment of FIGS. 1 and 2, three layers of slit sections 12A, 12B, 12C are provided; however, unlike the embodiment of FIGS. 1 and 2, the embodiment of FIG. 3 does not include any vacant slits in any of the slit sections 12A, 12B, 12C. Rather, a permanent magnet $PM_1$ is embedded in the slit 12A, a permanent magnet $PM_2$ is embedded in the slit 12B, and a permanent magnet $PM_3$ is embedded in the slit 12C. In the first embodiment of FIG. 1, the permanent magnets embedded in the slit sections 12A, 12B, 12C have substantially the same characteristics. In the second embodiment of FIG. 3, three kinds of permanent magnets of different characteristics are embedded in the three slit sections 12A, 12B, 12C of each magnetic pole.

The permanent magnet $PM_1$ has a value of residual magnetic flux density of $Br_1$. The permanent magnet $PM_2$ has a value of residual magnetic flux density of $Br_2$. The permanent magnet $PM_3$ has a value of residual magnetic flux density of $Br_3$. The respective values of the residual flux densities satisfy the following expression:

$$Br_1 > Br_2 > Br_3 \quad (5).$$

In addition, the amounts of total magnetic flux generated by the permanent magnets $PM_1$, $PM_2$, $PM_3$ when the rotor is assembled in a rotary electric device are $\Phi_1$, $\Phi_2$, $\Phi_3$ respectively, and the following expression is satisfied:

$$\Phi_1 < \Phi_2 < \Phi_3 \quad (6).$$

Also, when the foregoing expressions (5), (6) are satisfied in the embodiment of the permanent magnet rotor 10 illustrated in FIG. 3, the distribution of magnetic flux density formed in the clearance between the rotor and the stator when the rotor is assembled in a rotary electric device has a stepped shape close to a sinusoidal wave, thereby producing the effect of decreased torque ripples and cogging torque, as in the first embodiment of FIGS. 1 and 2.

In addition, in the embodiment of FIG. 3, no vacant slit is provided. Thus, the permanent magnets $PM_1$, $PM_2$, $PM_3$ can be embedded more efficiently in the rotor core, thereby providing a structure favorable to size reduction of the permanent magnet rotor 10.

Figure 4:
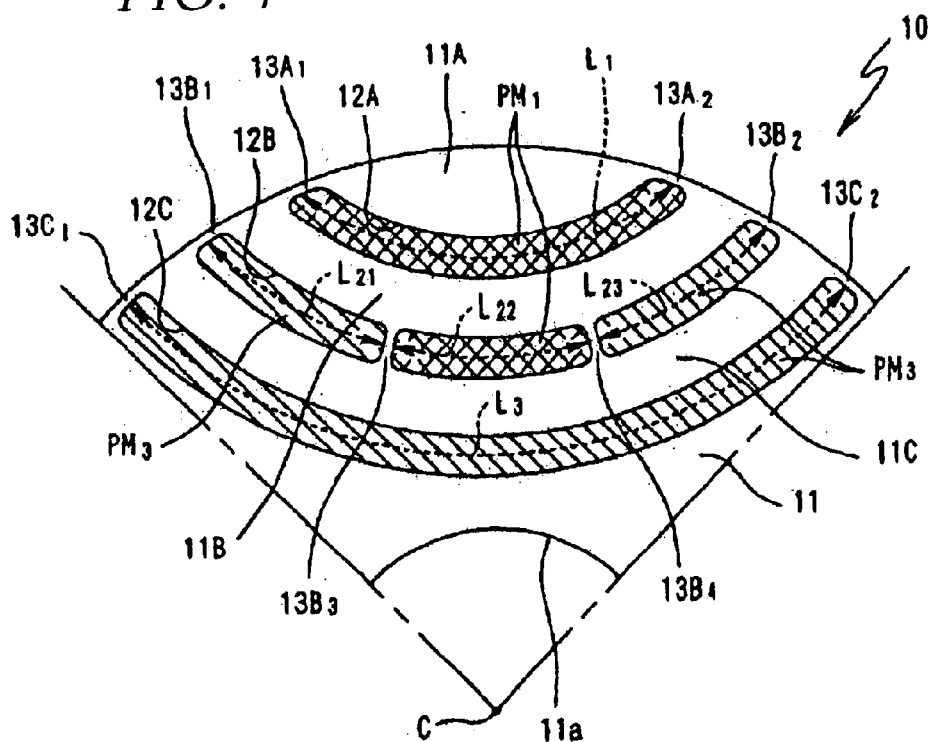
FIG. 4 is a view showing the configuration of a third embodiment of this invention.

FIG. 4 illustrates an end view of one pole of a permanent magnet rotor 10 in accordance with a third embodiment of the invention. The view is similar to the view of the first embodiment in FIG. 1 and the second embodiment in FIG. 3, and like elements as in the first and second embodiments are designated by like symbols and repeated descriptions of the like elements are omitted.

The permanent magnet rotor 10 of the embodiment of FIG. 4 is approximately the same as that in the second embodiment of FIG. 3, except that bridges $13B_3$, $13B_4$ are formed at two locations longitudinally in the slit section 12B such that the slit section 12B is divided into three substantially equal segments, a first (leftmost) section, a second (middle) section and a third (rightmost) section. A permanent magnet $PM_1$ of a first kind is embedded in the second segment defined between the bridges $13B_3$ and $13B_4$, and permanent magnets $PM_3$ of a second kind are embedded in the first segment defined between the bridges $13B_1$ and $13B_3$ and in the third segment defined between the bridges $13B_2$ and $13B_4$. In this particular embodiment of FIG. 4, three slit sections 12A, 12B, 12C are provided as in the second embodiment of FIG. 3. However, in the embodiment of FIG. 4, only two kinds of permanent magnets $PM_1$, $PM_3$ are used. Thus, the number of kinds of permanent magnets is smaller than in the second embodiment of FIG. 3.

In the arrangement illustrated in FIG. 4, the mean residual magnetic flux density $Br_2'$ of the permanent magnets $PM_1$, $PM_3$ embedded in the slit section 12B is written as:

$$Br_2' = \{L_{22}Br_1 + (L_{21}+L_{23})Br_3\}/(L_{21}+L_{22}+L_{23}) \quad (7).$$

where $L_{21}$, $L_{22}$, $L_{23}$ are the lengths of the magnets in the first segment, the second segment and the third segment, respectively, of the slit section 12B in FIG. 4.

In the embodiment of FIG. 4, the following expressions are satisfied:

$$Br_1 > Br_2' > Br_3 \quad (8),$$

$$\Phi_1 < \Phi_2 < \Phi_3 \quad (9).$$

Therefore, in the third embodiment of FIG. 4, as in the first and second embodiments of FIGS. 1 and 3, the distribution of magnetic flux density formed in the clearance between the rotor and the stator when the rotor is assembled in a rotary electric device has a stepped shape close to a sinusoidal wave, producing the effect of decreased torque ripples and cogging torque.

In the embodiment of FIG. 4, two kinds of permanent magnets $PM_1$, $PM_3$ are enough to meet the foregoing requirement, so that the number of kinds of magnets is smaller compared with that in the second embodiment of FIG. 3, thus providing a structure more favorable to cost reduction.

Figure 5:
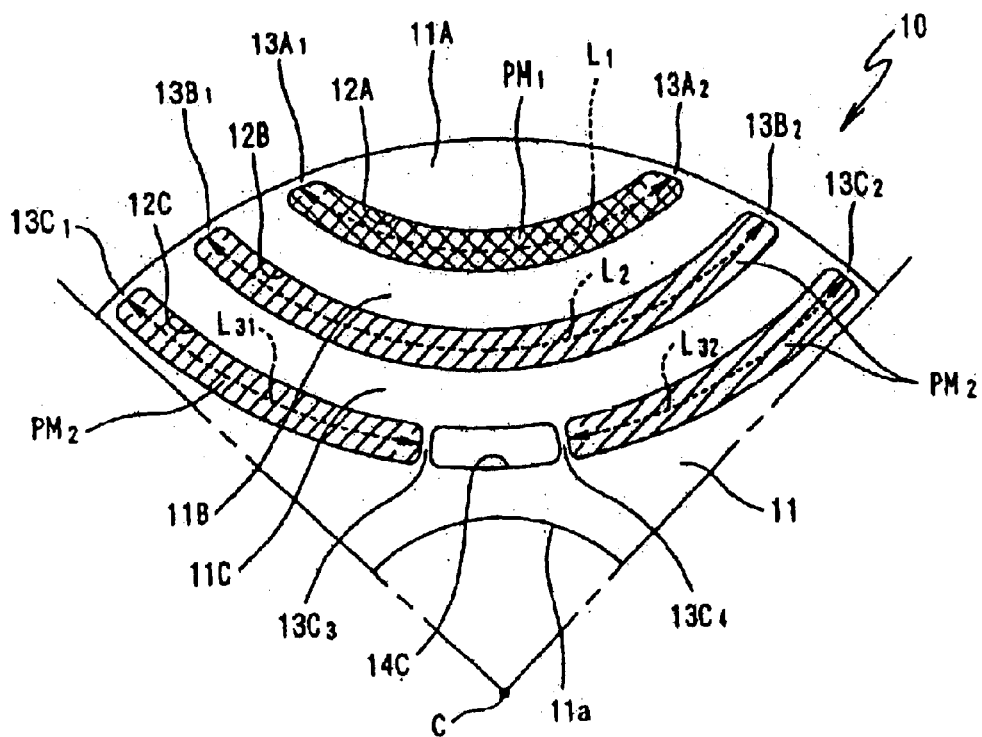
FIG. 5 is a view showing the configuration of a fourth embodiment of this invention.

FIG. 5 illustrates an end view of one pole of a permanent magnet rotor 10 in accordance a fourth embodiment of this invention. The view is similar to the views of the first, second and third embodiments in FIGS. 1, 3 and 4, and like elements as in the first, second and third embodiments are designated by like symbols, and repeated descriptions of the like elements are omitted.

The permanent magnet rotor 10 of the embodiment of FIG. 5 has a configuration approximately the same as the configuration of the third embodiment of FIG. 4, except that bridges $13C_3$, $13C_4$ are formed in the innermost slit section 12C near the middle portion, as in the first embodiment of FIG. 1, to define three segments of the slit section 12C. A middle section between the bridges $13C_3$ and $13C_4$ is a vacant slit 14C in which no permanent magnet is embedded. A leftmost segment between the bridges $13C_1$ and $13C_3$ and a rightmost section between the bridges $13C_2$ and $13C_4$ have embedded permanent magnets $PM_2$ positioned therein. The slit 12A has an embedded permanent magnet $PM_1$ positioned therein. The slit 12B has an embedded permanent magnet $PM_2$ positioned therein.

In the embodiment of FIG. 5, the following expression is satisfied:

$$\Phi_1 < \Phi_2 < \Phi_3 \quad (10).$$

Therefore, in the fourth embodiment of FIG. 5, as in the first and second embodiments of FIGS. 1 and 3, the distribution of magnetic flux density formed in the clearance between the rotor and the stator when the rotor is assembled in a rotary electric device has a stepped shape close to a sinusoidal wave, producing the effect of decreased torque ripples and cogging torque.

FIG. 6 illustrates an end view of one pole of a permanent magnet rotor 10 in accordance a fifth embodiment of this invention. The view is similar to the views of the first, second, third and fourth embodiments in FIGS. 1, 3, 4 and 5, and like elements as in the first, second, third and fourth embodiments are designated by like symbols, and repeated descriptions of the like elements are omitted.

In the fifth embodiment the permanent magnet rotor 10 of FIG. 6, the permanent magnets PM are arranged in two layers (n=2) of slits 12A and 12B. Unlike the previous embodiments, the slit sections 12A, 12B do not have the shape of an arc. Rather, the slit sections 12, 12B have the general shape of a letter U. In the embodiment of FIG. 6, no vacant slit is formed in the slit section 12B, and the distance (width of the radially outer portion 11B) between the slit sections 12A, 12B is differentiated such that the width is wider toward the longitudinal ends of the permanent magnets PM and narrower toward the centers thereof.

Also in the arrangement of FIG. 6, the distribution of magnetic flux density formed in the clearance between the rotor and the stator when the rotor is assembled in a rotary electric device has a stepped shape close to a sinusoidal wave. Therefore, according to the embodiment of FIG. 6, the permanent magnet rotor 10, in comparison with a conventional permanent magnet rotor, has a distortion factor of the waveform of induced voltage that is decreased, and also has decreased torque ripples, cogging torque, noises and vibrations. Additional layers of slits (not shown) can also be included in the embodiment of FIG. 6.

FIG. 7 illustrates an end view of one pole of a permanent magnet rotor 10 in accordance a sixth embodiment of this invention. The view is similar to the views of the first, second, third, fourth and fifth embodiments in FIGS. 1, 3, 4, 5 and 6, and like elements as in the first, second, third, fourth and fifth embodiments are designated by like symbols, and repeated descriptions of the like elements are omitted.

The arrangement of the sixth embodiment of FIG. 7 is approximately the same as in the first embodiment, except that the embodiment of FIG. 7 has a relationship between four angles $\alpha_1$, $\alpha_2$, $\alpha_3$, $\alpha_4$, which is not shown in the first embodiment. The relationship between the four angles $\alpha_1$, $\alpha_2$, $\alpha_3$, $\alpha_4$, is written as:

$$\alpha_1 > \alpha_2 > \alpha_3 > \alpha_4 \qquad (11),$$

where $\alpha_1$, $\alpha_2$, $\alpha_3$, $\alpha_4$ are defined in the same half section of the rotor pole as follows:

$\alpha_1$ is an angle made by a first straight line $S_1$ that connects the center of the magnetic pole and the rotation center C of the rotor core 11 and a second straight line $S_2$ that connects one longitudinal end of the permanent magnet PM embedded in the slit 12A and the rotation center C;

$\alpha_2$ is an angle made by the second straight line $S_2$ and a third straight line $S_3$ that connects the closest longitudinal end of the permanent magnet embedded in the slit 12B and the rotation center C;

$\alpha_3$ is an angle made by the third straight line $S_3$ and a fourth straight line $S_4$ that connects the closest longitudinal end of the permanent magnet PM embedded in the slit 12C and the rotation center C; and $\alpha_4$ is an angle made by the fourth straight line $S_4$ and a fifth straight line $S_5$ that corresponds to the straight line CL shown in FIG. 2 that passes between the adjacent poles and through the rotation center C.

In the arrangement of FIG. 7, the shape of the distribution of magnetic flux density formed in the clearance between the rotor and the stator when the rotor is assembled in a rotary electric device can be made closer to a sinusoidal wave when the relationships between the angles $\alpha_1$, $\alpha_2$, $\alpha_3$, $\alpha_4$ satisfy the expression (11) than when the relationships between the angles $\alpha_1$, $\alpha_2$, $\alpha_3$, $\alpha_4$ do not satisfy the expression (11), thereby providing more pronounced reduction in the distortion factor of the waveform of induced voltage, torque ripples and cogging torque, as well reduction in noises and vibrations.

FIG. 14 illustrates an embodiment of a rotor core configured with two layers of slits generally in accordance with the fifth embodiment of FIG. 6. FIG. 14 shows lines $S_1$, $S_2$, $S_3$ and $S_4$ and angles $\alpha_1$, $\alpha_2$ and $\alpha_3$, which are identified in accordance with corresponding lines and angles in FIG. 7. Since the embodiment of FIG. 14 has only two layers of slits, the line $S_4$ of FIG. 14 corresponds to the line $S_5$ of FIG. 7, which passes between the adjacent poles of the rotor core.

FIG. 8 illustrates an end view of one pole of the permanent magnet rotor 10 in accordance with a seventh embodiment of the present invention. In FIG. 8, like elements as in the first embodiment of FIG. 1 are designated by like symbols, and repeated descriptions of such elements are omitted.

Electrical angles $\theta_1$, $\theta_2$, $\theta_3$ are defined in FIG. 8. In particular, the angle $\theta_1$ is defined by two lines connecting the opposite longitudinal ends of the permanent magnet embedded in the slit 12A with the rotation center C of the rotor core 11. The angle $\theta_2$ is defined by two lines connecting the opposite longitudinal ends of the permanent magnets embedded in the leftmost and rightmost sections of the slit 12B with the rotation center C of the rotor core 11. The angle $\theta_3$ is defined by two lines connecting the opposite longitudinal ends of the permanent magnets embedded in the leftmost and rightmost sections of the slit 12C with the rotation center C of the rotor core 11. The amounts of total magnetic flux generated by the permanent magnet layers 12A, 12B, 12C when the rotor is assembled in a rotary electric device are $\Phi_1$, $\Phi_2$, $\Phi_3$, respectively.

The widths of the bridges $13A_1$, $13A_2$, $13B_1$, $13B_2$, $13B_3$, $13B_4$, $13C_1$, $13C_2$, $13C_3$, $13C_4$, as dimensioned in the tangential directions of the slit sections 12A, 12B, 12C, are $d_{11}$, $d_{12}$, $d_{21}$, $d_{22}$, $d_{23}$, $d_{24}$, $d_{31}$, $d_{32}$, $d_{33}$, and $d_{34}$, respectively. The sum of the widths of the bridges $13A_1$ and $13A_2$ for the first slit layer 12A is $d_1 = (d_{11} + d_{12})$. The sum of the widths of the bridges $13B_1$, $13B_2$, $13B_3$ and $13B_4$ for the second slit layer 12B is $d_2 = (d_{21} + d_{22} + d_{23} + d_{24})$. The sum of the widths of the bridges $13C_1$, $13C_2$, $13C_3$ and $13C_4$ for the third slit layer 12C is $d_3 = (d_{31} + d_{32} + d_{33} + d_{34})$. The saturated magnetic flux density is Bs.

In the embodiment of FIG. 8, the following expression (12) is satisfied:

$$(\Phi_1 - (d_1\ Bs)):(\Phi_2 - (d_2\ Bs)):(\Phi_3 - (d_3\ Bs)) =$$
$$(\theta_1 \cos(\theta_1/4)):((\theta_2 - \theta_1)\cos((\theta_2 + \theta_1)/4) + \theta_1 \cos(\theta_1/4)):(\theta_3 - \theta_2)\cos((\theta_3 + \theta_2)/4) + (\theta_2 - \theta_1)\cos((\theta_1 + \theta_2)/4) + \theta_1 \cos(\theta_1/4) \qquad (12).$$

The expression (12) equates the ratios of the three elements to the left of the equal sign to the ratios of the three elements to the right of the equal sign. The expression (12) is of the form a:b:c=d:e:f, wherein the ratio of a to b and the ratio of b to c are respectively equal to the ratio of d to e and the ratio of e to f.

The expression (12) can be expanded to the following general form with n elements on each side of the equal sign:

$$(\Phi_1 - (d_1\ Bs)):(\Phi_2 - (d_2\ Bs)): \ldots :(\Phi_n - (d_n\ Bs)) =$$
$$\theta_1 \cos(\theta_1/4):(\theta_2 - \theta_1)\cos((\theta_2 + \theta_1)/4) + \theta_1 \cos(\theta_1/4): \ldots :(\theta_n - \theta_{n-1})\cos((\theta_n + \theta_{n-1})/4) + (\theta_{n-1} - \theta_{n-2})\cos((\theta_{n-1} + \theta_{n-2})/4) + \ldots + (\theta_2 - \theta_1)\cos((\theta_2 + \theta_1)/4) + \theta_1 \cos(\theta_1/4) \qquad (13).$$

It can be seen that the expression (12) is the expression (13) with n=3 for the embodiment of FIG. 8. The degree of satisfaction to the expressions (12) and (13) need not be strictly mathematical, but the expressions (12) and (13) may be approximately satisfied to obtain the advantages of this embodiment of the invention.

Figure 9:
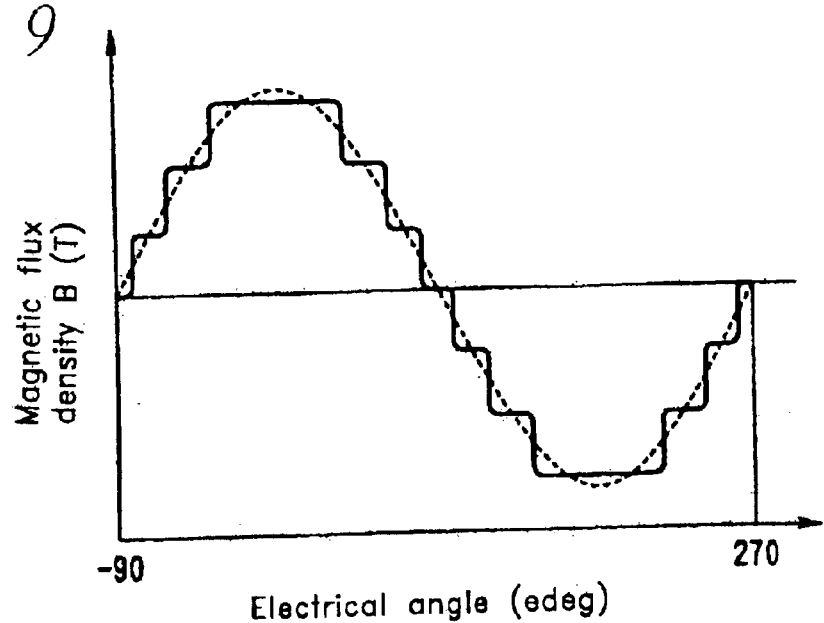
FIG. 9 is a graph showing the distribution of magnetic flux density generated in the clearance between the rotor and the stator of a permanent magnet electric motor according to the preferred embodiments.
Figure 13:
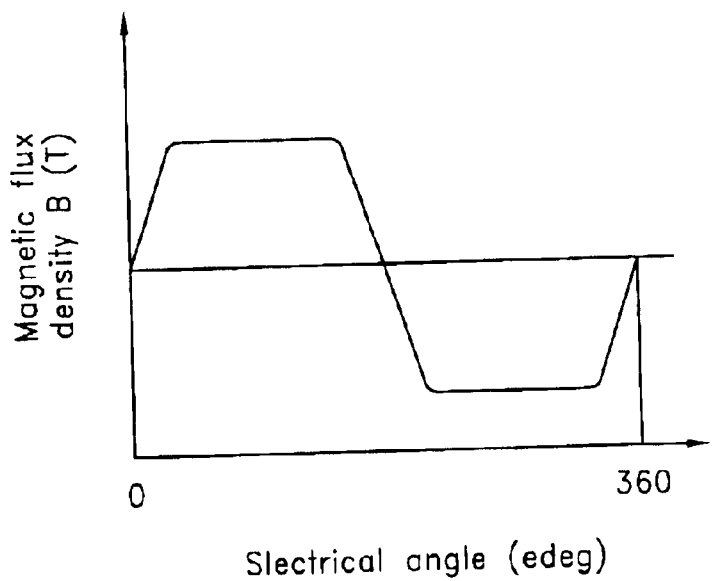
FIG. 13 is a graph showing a distribution of magnetic flux density generated in the clearance between the rotor and the stator of a conventional permanent magnet electric motor.

In the embodiment of the permanent magnet rotor of FIG. 8, the expression (12) is satisfied or approximately satisfied so that the distribution of magnetic flux density formed in the clearance between the rotor and stator when the rotor is assembled in a rotary electric device is shown by a solid line in FIG. 9. As illustrated in FIG. 9, the distribution of flux density has a stepped shape very close to a sinusoidal wave (illustrated by a dashed line in FIG. 9). The approximation of the distribution of magnetic flux density to a sinusoidal wave is clearer when compared with FIG. 13, in which the distribution of magnetic flux density in the prior art is shown. Therefore, according to the embodiment of the permanent magnet rotor 10 of FIG. 8, compared with a conventional permanent magnet rotor, the distortion factor of the waveform of induced voltage is decreased remarkably. Torque ripples and cogging torque are also reduced.

Figure 10:
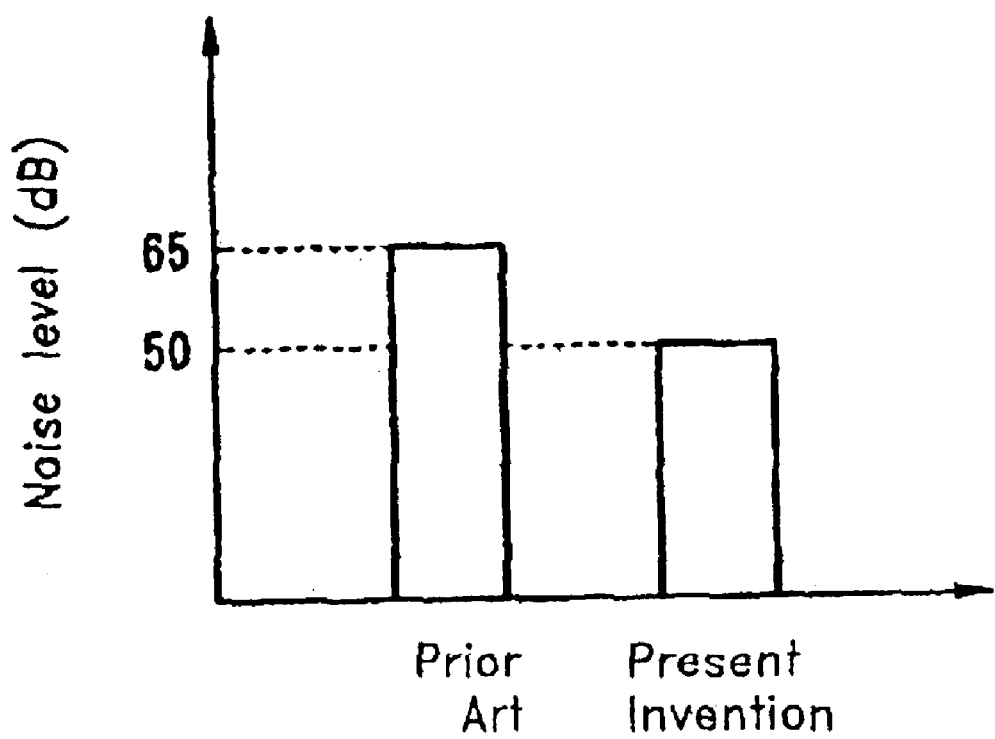
FIG. 10 is a graph showing, in comparison, noise levels of a permanent magnet electric motor according to this invention and a conventional one.

In addition to the foregoing, reduction of the iron loss by higher harmonics results in a decrease in noises without a drop in output. FIG. 10 illustrates a graph of a noise level (overall noise value in the 0–20 kHz range of an electric motor running at 4000 rpm) at a measuring point 100 millimeters away from the side of a permanent magnet motor incorporating the permanent magnet rotor 10 of this embodiment compared with that of a permanent magnet motor incorporating a conventional permanent magnet rotor, measured in the same condition. The graph shows that the noise level can be decreased by approximately 25% compared with the conventional permanent magnet motor.

Figure 11:
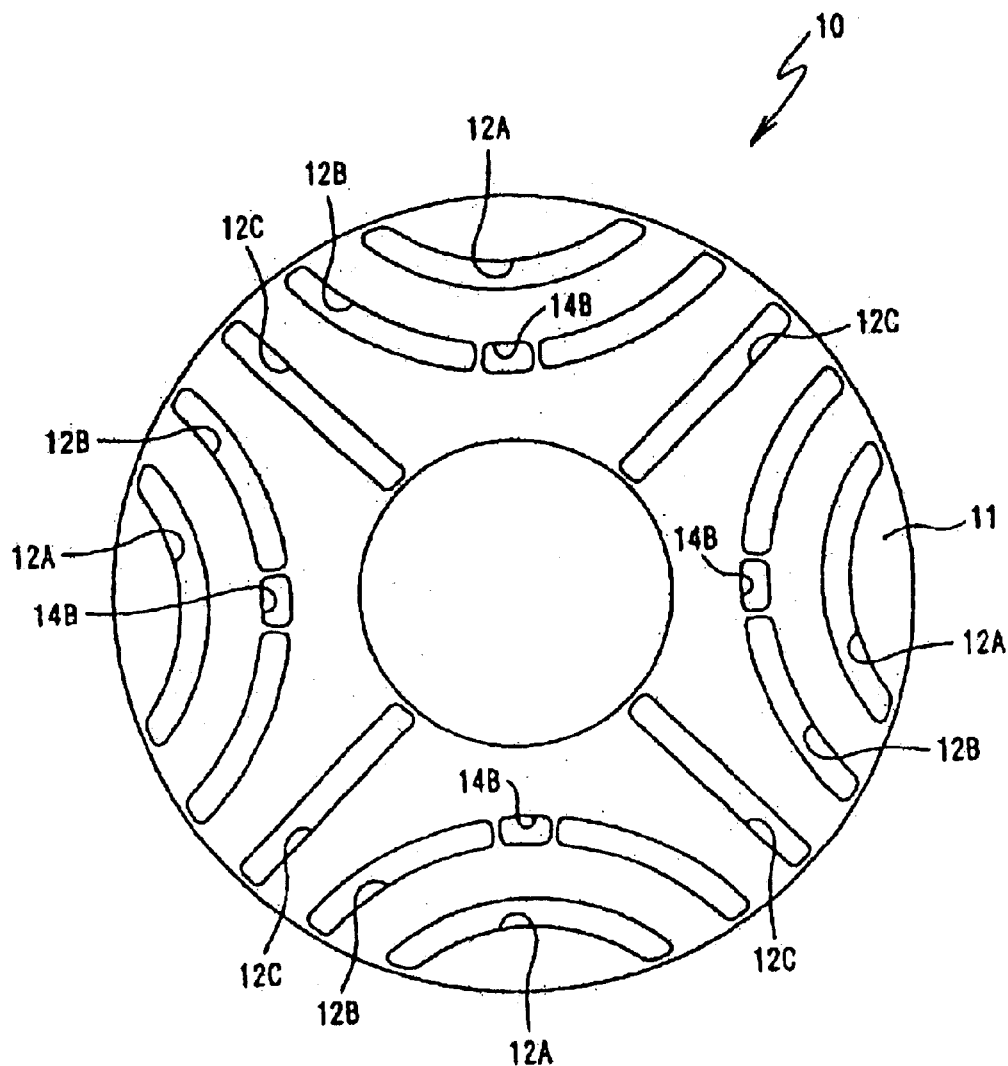
FIG. 11 is a view of an example of a permanent magnet rotor with radially innermost magnets being used in common to adjacent magnet poles.
Figure 12:
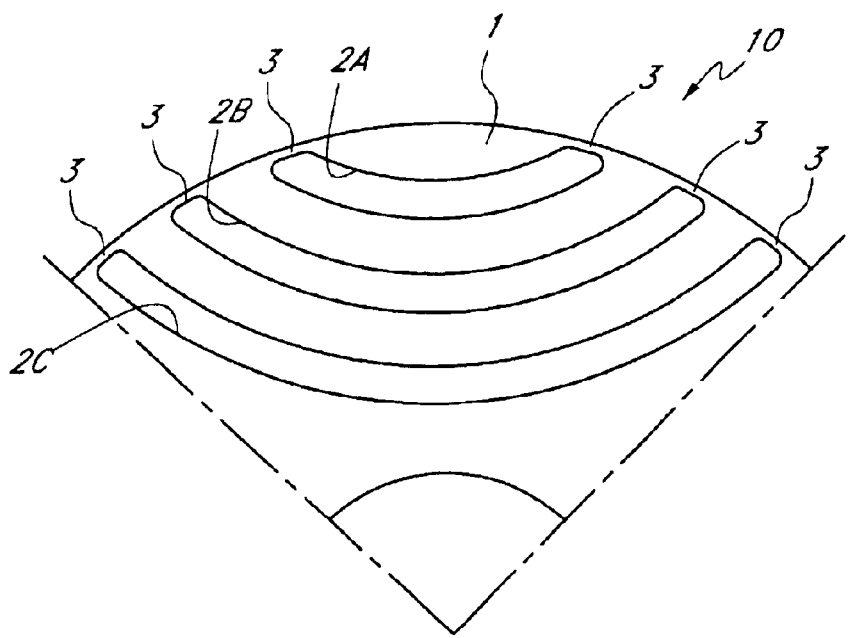
FIG. 12 is a view of a configuration of a conventional permanent magnet rotor.

In the seventh embodiment of FIG. 8, no specific values are given for magnetic pole electrical angles $\theta_1$-$\theta_n$. Studies have shown that values described below are preferable. The values below are provided in units of electrical angle. The number of layers "n" is set forth as an integer to mean that the permanent magnets are independent in each pole, as in the foregoing embodiments. If the number of layers is set forth as an integer plus "0.5" (e.g., n=1.5), then the radially innermost permanent magnets (for example, a permanent magnet embedded in the slit section 12C in FIG. 1) are used in common to adjacent poles, as shown, for example, in FIG. 11.

n=1.5;
$\theta_1$=110, $\theta_2$=180
n=2;
$\theta_1$=92, $\theta_2$=154
n=2.5;
$\theta_1$=83, $\theta_2$=134, $\theta_3$=180
n=3;
$\theta_1$=77, $\theta_2$=126, $\theta_3$=163
n=3.5;
$\theta_1$=66, $\theta_2$=112, $\theta_3$=147, $\theta_4$=180
n=4;
$\theta_1$=65, $\theta_2$=101, $\theta_3$=133, $\theta_4$=165
n=4.5;
$\theta_1$=58, $\theta_2$=92, $\theta_3$=124, $\theta_4$=153, $\theta_5$=180
n=5
$\theta_1$=52, $\theta_2$=85, $\theta_3$=116, $\theta_4$=141, $\theta_5$=169

FIG. 14 illustrates an embodiment of a rotor core configured with two layers of slits generally in accordance with the fifth embodiment of FIG. 6. FIG. 15 shows the angles $\theta_1$ and $\theta_2$ and the bridge widths $d_{11}$, $d_{12}$, $d_{21}$ and $d_{22}$ in the expression (13), which are identified in accordance with corresponding angles and bridge widths in FIG. 8. Since the embodiment of FIG. 15 has only two layers of slits, only two angles and four bridges are shown.

According to the invention as described above, the distribution of magnetic flux formed in the clearance between the rotor and the stator has a shape close to a sinusoidal wave, so that the distortion factor of the waveform of induced voltage is decreased and so that torque ripples and cogging torque are also decreased.

While preferred embodiments of this invention have been disclosed herein, those skilled in the art will appreciate that changes and modifications may be made therein without departing from the spirit and scope of the invention as defined in the appended claims.

What is claimed is:

1. A permanent magnet rotor comprising a rotor core that comprises a plurality of magnetic poles, the rotor core including a plurality of permanent magnets embedded in slit sections formed in layers for each magnetic pole, the layers comprising at least a radially innermost layer and a radially outermost layer, each layer having a respective middle portion and respective longitudinal ends, the layers spaced apart from each other by respective distances, the distances by which the layers are spaced apart being greater between the respective longitudinal ends of the layers than between the respective middle portions of the layers, wherein for each magnetic pole:

a first straight line is defined radially outward from a center of the rotor core through a center of the magnetic pole;

a second straight line is defined radially outward from the center of the core to a longitudinal end of the permanent magnet in the radially outermost layer;

a third straight line is defined radially outward from the center of the core to a longitudinal end of the permanent magnet in the radially innermost layer proximate to the longitudinal end of the permanent magnet in the radially outermost layer;

a fourth straight line is defined radially outward from the center of the core midway between the magnetic pole and an adjacent magnetic pole;

a first angle defined between the first straight line and the second straight line is greater than a second angle defined between the second straight line and the third straight line; and the second angle is greater than a third angle defined between the third straight line and the fourth straight line.

2. The permanent magnet rotor of claim 1, wherein the embedded permanent magnets are formed such that the slits are filled with bond magnet and the bond magnet is then solidified.

3. A permanent magnet rotor comprising a rotor core that comprises a plurality of magnetic poles, the rotor core including a plurality of permanent magnets embedded in slit sections formed in layers for each magnetic pole, the layers comprising at least a radially innermost layer and a radially outermost layer, each layer having a respective middle portion and respective longitudinal ends, the levers spaced apart from each other by respective distances, the distances by which the layers are spaced apart being greater between the respective longitudinal ends of the layers than between the respective middle portions of the layers, wherein each layer of permanent magnets has first and second longitudinal ends proximate to respective locations on an outer circumference of the rotor core, the ends spaced from the respective locations on the outer circumference by respective bridges, wherein:

a first pair of straight lines is defined between a center of the rotor core and the longitudinal ends of the permanent magnets in the radially outermost layer, and a first electrical angle $\theta_1$ is defined between the first pair of straight lines;

a second pair of straight lines is defined between a center of the rotor core and the longitudinal ends of the of the permanent magnets in the radially innermost layer, and a second electrical angle $\theta_2$ is defined between the second pair of straight lines;

the radially outermost layer generates a total magnetic flux $\phi_1$;

the radially innermost layer generates a total magnetic flux $\phi_2$; and the following expression of equality between ratios is at least approximately satisfied:

$(\phi_1 - (d_1 Bs)):(\phi_2 - (d_2 Bs)) =$ $\theta_1 \cos(\theta_1/4):(\theta_2 - \theta_1)\cos((\theta_2 + \theta_1)/4) + \theta_1 \cos(\theta_1/4)$ where $d_1$ represents the sum of widths of bridges of the radially outermost layer, and $d_2$ represents the sum of widths of bridges of the radially innermost layer, and Bs is a saturated magnetic flux density of the rotor core.

4. The permanent magnet rotor of claim 3, wherein the embedded permanent magnets are formed such that the slits are filled with bond magnet and the bond magnet is then solidified.

* * * * *

UNITED STATES PATENT AND TRADEMARK OFFICE
CERTIFICATE OF CORRECTION

PATENT NO. : 6,741,003 B2  
DATED : May 25, 2004  
INVENTOR(S) : Shinya Naito et al.

It is certified that error appears in the above-identified patent and that said Letters Patent is hereby corrected as shown below:

<u>Title page,</u>  
Item [73], Assignee, change "Kaisa" to -- Kaisha --.

Signed and Sealed this

Sixteenth Day of November, 2004

JON W. DUDAS  
*Director of the United States Patent and Trademark Office*